United States Patent Office 3,429,756

Patented Feb. 25, 1969

3,429,756

METHOD FOR THE PREPARATION OF INORGANIC SINGLE CRYSTAL AND POLYCRYSTALLINE ELECTRONIC MATERIALS

Warren O. Groves, St. Louis, Mo., assignor to Monsanto Company, St. Louis, Mo., a corporation of Delaware No Drawing. Filed Feb. 5, 1965, Ser. No. 430,748

U.S. Cl. 156—17 4 Claims

Int. Cl. H01l 7/00

The invention described herein was made in the performance of work under a NASA contract and is subject to the provisions of the National Aeronautics and Space Act of 1958, Public Law 85–568 (72 Stat. 426; 42 U.S.C. 2451), as amended.

This invention relates to a method for producing self-supporting semiconductor crystals suitable for device fabrication.

More particularly, this invention relates to a method for producing semiconductor crystals of large area and having smooth, flat, damage-free surfaces.

Still more particularly this invention involves the removal of substrate materials, by selective etching, from epitaxial films or overgrowths of semiconductor materials deposited thereon to expose a smooth, flat and damage-free surface of said film suitable for device fabrication. The epitaxial deposits herein are thick enough to be self-supporting.

In the fabrication of electronic devices it is highly desirable and frequently imperative that the semiconductive component thereof be essentially free of surface defects and work damage. It is also necessary that the thin film semiconductor component be smooth, flat and of uniform thickness for optimum performance.

The production and reliable utilization of many electronic devices having the requisite electrical properties for various device applications has been hindered by lack of single crystal semiconductor components having the above physical characteristics.

Various methods are known and have been used to deposit single crystal semiconductor materials from a vapor phase. The more practical methods involve vapor deposition of single crystal materials epitaxially upon seed crystal substrates of the same or different material. The substrate frequently serves merely to support the epitaxial overgrowth.

Among the methods used for epitaxial deposition of single crystal materials might be mentioned the use of various transport agents to carry the semiconductor element or compound from a source region to a deposition region. Examples of such transport systems are the use of elemental halogens, halogen compounds or hydrogen halides as transport agents carried in inert gases, e.g., hydrogen, helium or argon. Other vapor deposition methods involve thermal decomposition or hydrogen reduction of compounds containing semiconductive elements which react and deposit in single crystal form on a seed crystal substrate.

In all of the foregoing vapor deposition processes, rigid control must be exercised over process conditions such as careful preparation of seed crystal substrates, maintaining proper reaction conditions such as flow rates of reactants, relative concentrations of carrier gas to reactants, temperature gradients in the deposition zone, etc. Reactant materials often must be very pure such as in the preparation of GaP from its elements carried by $H_2$ in HCl.

In spite of careful control exercised in carrying out vapor phase depositions of single crystal materials, the deposited epitaxial film frequently has numerous imperfections affecting the suitability of the surface layer of the material in device fabrication and use. For example, some of the more common imperfections include surface defects such as humps, pits and cracks which may arise from impurities in the reactants or some surface condition of the substrate or for other reasons. Consequently, it is necessary to remove these surface defects in order to suitably use the single crystal semiconductor in various devices. These surface defects are commonly removed by lapping, etching and polishing operations. However, in carrying out these operations, particularly with very thin films and with lapping operations, other defects are often generated. These defects are referred to as "work damage" and include microcracks, dislocation networks and crystal strain. The use of etchants to eliminate surface defects often creates other problems, e.g., it is very difficult, if not impossible, to control the degree and depth of penetration of the etchant into the material, hence, the semiconductor crystal frequently is of non-uniform thickness; also, the surface frequently has an irregular contour or wavy appearance and the crystal frequently has rounded corners and edges.

Another approach to the problem of obtaining smooth, flat single crystal materials having large area for device fabrication involves the vapor deposition of epitaxial overgrowth on various substrates as described above. Subsequently, the substrate material is removed by lapping to expose the surface of the single crystal epitaxial layer contiguous to and forming an interface with said substrate. When the deposition procedure has been carefully conducted on substrate crystals the surface of which has been properly prepared, the junction between the epitaxial overgrowth and substrate crystal will be well-defined, smooth and flat, having large contact area. Therefore, by removing the substrate the thin layer of epitaxial material contiguous thereto is made available for device fabrication.

However, the removal of the substrate layer by mechanical means as by sawing and/or lapping subjects the epitaxial crystal to work damage effects as described above. Moreover, it is most difficult to remove the substrate by lapping in such manner that the lapped surface of the substrate is parallel to surface of the overgrowth in contact therewith. Hence, by this operation the entire interface surface of the epitaxial layer is not exposed and made available for device fabrication. Some of the overgrowth material must then be removed to compensate for this non-parallelism and expose the entire surface of the epitaxial layer.

Accordingly, it is an object of this invention to provide self-supporting semiconductor materials suitable for device fabrication.

Another object of this invention is to provide semiconductor single crystals which are smooth, flat, essentially free of surface defects and work damage and have relatively large area.

Still another object of this invention is to provide a method for obtaining the above described semiconductor materials which is simple, rapid and economical.

Yet another object of the invention is the provision of a method for obtaining single crystal semiconductor materials as described above which is not dependent upon any particular method of preparing and depositing such single crystals.

Another object of this invention is to provide a method for obtaining the desired single crystal material which substantially eliminates substrate removal by lapping with its attendant handicaps as described above.

According to the present invention it has been discovered that smooth, flat, damage-free single crystals of large area can be made available for device fabrication by the use of a selective etching operation which completely removes the substrate upon which the desired single crystal material has been deposited with negligible effect on the single crystal material itself which is substantially impervious to the etchant used.

Broadly, the invention contemplates the use of selective oxidizing etchants in which the solution rates of the substrate materials is high relative to the solution rate of the epitaxial material deposited thereon. Preferably, the solution rate of the epitaxial material will always be low and the higher the ratio of these respective solution rates, i.e., solution rate of substrate relative to solution rate of the epitaxial film, in a given etchant, the better.

The various etchants contemplated herein include both acidic and basic etching solutions which are polishing etches relative to the epitaxial material. Exemplary etchants include mixtures of alkali metal hydroxides, e.g., lithium, sodium or potassium hydroxide and hydrogen peroxide; halogens, e.g., fluorine, chlorine or bromine, and alkanols, e.g., methanol, propanol, butanol and the like; concentrated nitric acid; mixtures of hydrofluoric acid, nitric acid and water with or without acetic acid; boric oxide and lead oxide; perchloric acid; sodium carbonate; ammonium chloride; various salts such as sodium fluoride, potassium acid fluoride. Various mixtures of these etchants are also contemplated.

The relative proportions of the ingredients in etching mixtures and etching temperatures can be varied over a wide range and thereby control etching times.

In general, the semiconductor crystals prepared according to the present invention contemplate inorganic single crystal semiconductor materials such as silicon, germanium, compounds and alloys of elements selected from Groups II and VI (II–VI compounds) and elements from Groups III and V (III–V compounds) of Mendeleef's Periodic System. These semiconductor single crystals preferably are epitaxially deposited on substrates of a dissimilar semiconductor material, thus forming heterojunctions. However, substrates of the same material as the epitaxial overgrowth (homojunctions) are also contemplated wherein the substrate or epitaxial overgrowth is so doped as to induce in one material, e.g., heavily doped $n^+$-type GaAs, significantly different solution rate with respect to the other material, e.g., lightly doped n-type GaAs.

It is also within the purview of this invention to prepare organic semiconductor single crystals e.g., metal polyphthalocyanines, particularly copper polyphthalocyanine, in the same manner for device fabrication. In addition, it is within the purview of this invention to obtain polycrystalline materials suitable for use in various electronic devices.

In broad aspect the present invention is applicable to the preparation of semiconductor materials, particularly single crystal materials, for use in devices which depend on electrical properties of a thin film surface layer. As mentioned above, preferred materials herein include single crystals of silicon, germanium, II–VI compounds and alloys such as the sulfides, selenides and tellurides of zinc, cadmium and mercury and III–V compounds such as the nitrides, phosphides, arsenides and antimonides of boron, aluminum, gallium and indium. Among the electronic devices which utilize the single crystal materials produced herein are transistors, rectifiers, varactor diodes, switching diodes, photoelectric cells such as photoconductors, photovoltaic cells, e.g., solar cells, electroluminescent devices, detectors, resistors, amplifiers and the like.

The invention will be better understood by reference to the specific embodiments present below.

EXAMPLE 1

This example illustrates the preparation and recovery of single crystal gallium phosphide, GaP.

Into a fused silica reaction tube was placed a small quantity of red phosphorus near the source end of the tube, elemental gallium near the center of the tube and a seed crystal of gallium arsenide near the deposition end of the tube. The fused silica tube was then placed into three furnaces butted end to end in such manner that the phosphorus, gallium and gallium arsenide were each located within the confines of one of the furnaces. As a preliminary step to condition the gallium arsenide substrate, hydrogen was passed over the phosphorus heated to a temperature of about 400° C. Phosphorus was carried over the gallium and gallium arsenide heated to about 1000° C. for about 20 minutes. The gallium and gallium arsenide temperatures were then reduced to about 890° C. and 815° C., respectively. Hydrogen chloride was then admixed with the hydrogen and this mixture carrying vaporized phosphorus passed over the gallium source into the deposition zone, containing the gallium arsenide seed crystal. Flow rates for the $HCl:H_2:P_2$ mixture were 150:1:33 cc./min. Gallium phosphide was deposited as an epitaxial film on the substrate. The interface between the epitaxial film and substrate was smooth and flat and the upper surface of the film contained microscopically rough mat surface having some small nodular growths. This surface was further treated by passing phosphorus vapor in hydrogen but without HCl over the GaP/GaAs structure heated to 1000° C. Again the source and substrate temperatures were reduced and HCl introduced to deposit more GaP. This procedure was repeated five times, thus building up the thickness of the overgrowth to about 175 microns. The surface of the GaP is somewhat irregular due to a build up of the nodular growths after repeated depositions.

Following the above treatment the GaP/GaAs structure was immersed in cold concentrated nitric acid. The GaAs substrate is completely dissolved in the nitric acid which does not dissolve the GaP. The bottom surface of the GaP, now exposed after the nitric acid treatment is essentially smooth, flat and damage free. This nitric acid etching treatment lasted about 16 hours.

EXAMPLE 2

In an alternative embodiment, GaP was used as the source material instead of elemental gallium and phosphorus, although the phosphorus-hydrogen pretreatment of the GaAs substrate was retained. Hydrogen chloride and hydrogen, at flow rates of 1:150 cc./min., respectively, were passed over the source GaP heated to 890° C. The GaP was carried to the deposition zone heated to about 850° C. where GaP deposited as an epitaxial film on the GaAs substrate. Again, the GaP/GaAs structure was immersed in hot concentrated nitric acid for about 15 minutes to selectively etch away the GaAs substrate, leaving a single crystal of GaP having a smooth, flat and damage-free surface, on which only slight traces of an etch pattern were seen.

EXAMPLE 3

In this example $n^+$ GaAs is used as substrate and n-type GaAs is epitaxially deposited thereon in the manner described in the preceding example. Tellurium is used as dopant in the $n^+$ GaAs in a concentration $1\times10^{19}$ atoms/cc. Upon completion of the reaction the $n^+$ GaAs/n-GaAs structure is immersed in an etching solution of $HF:HNO_3:H_2O$ in the ratio of 1:3:4 parts by volume, for about 10 hours. The $n^+$ GaAs is selectively dissolved in the etchant leaving a single crystal of n-type GaAs with an essentially smooth, flat and damage free surface.

EXAMPLE 4

In this example single crystal zinc sulfide is deposited as an epitaxial film on a substrate of cadmium telluride in the manner described in Example 2. Upon completion of the reaction the ZnS/CdTe structure is immersed in an etching solution of potassium hydroxide saturated with chlorine for about one hour. The substrate cadmium sulfide is selectively dissolved in the etchant leaving a single crystal of zinc sulfide, the interface surface of which is essentially smooth, flat, uniform and damage free.

The foregoing embodiments are fully illustrative of the invention described and claimed herein and are not intended to be limitative of the various modifications that will occur to those skilled in the art having the present disclosure to guide them.

I claim:

1. Process for the preparation of semiconductor single crystals having a substantially smooth, flat, uniform and damage-free surface, and being selected from the group consisting of III–V compounds and alloys thereof which comprises immersing an epitaxial film of one of said single crystals deposited on a compatible substrate material which is selected from the same group as said single crystals, in an etching solution in which said substrate material has a higher solution rate than said epitaxial single crystal and is selectively dissolved and said epitaxial single crystal is essentially unaffected.

2. Process for the preparation of single crystal gallium phosphide having a smooth, flat, uniform and essentially damage-free surface which comprises immersing an epitaxial film of gallium phosphide deposited on a substrate of gallium arsenide in an etching solution in which gallium arsenide is selectively dissolved while said gallium phosphide is essentially unaffected.

3. Process according to claim 2 wherein said etching solution is selected from the group consisting of oxidizing acids and bases and salts.

4. Process according to claim 3 wherein said etching solution comprises concentrated nitric acid.

References Cited

UNITED STATES PATENTS

| | | | |
|---|---|---|---|
| 2,847,287 | 8/1958 | Landgren | 156—17 |
| 3,224,911 | 12/1965 | Williams et al. | 148—175 |

J. STEINBERG, *Primary Examiner.*

U.S. Cl. X.R.

148—1.6, 175